April 8, 1952    W. D. RYCKMAN, JR    2,592,342
WHEEL SLIP PROTECTIVE DEVICE
Filed July 18, 1951
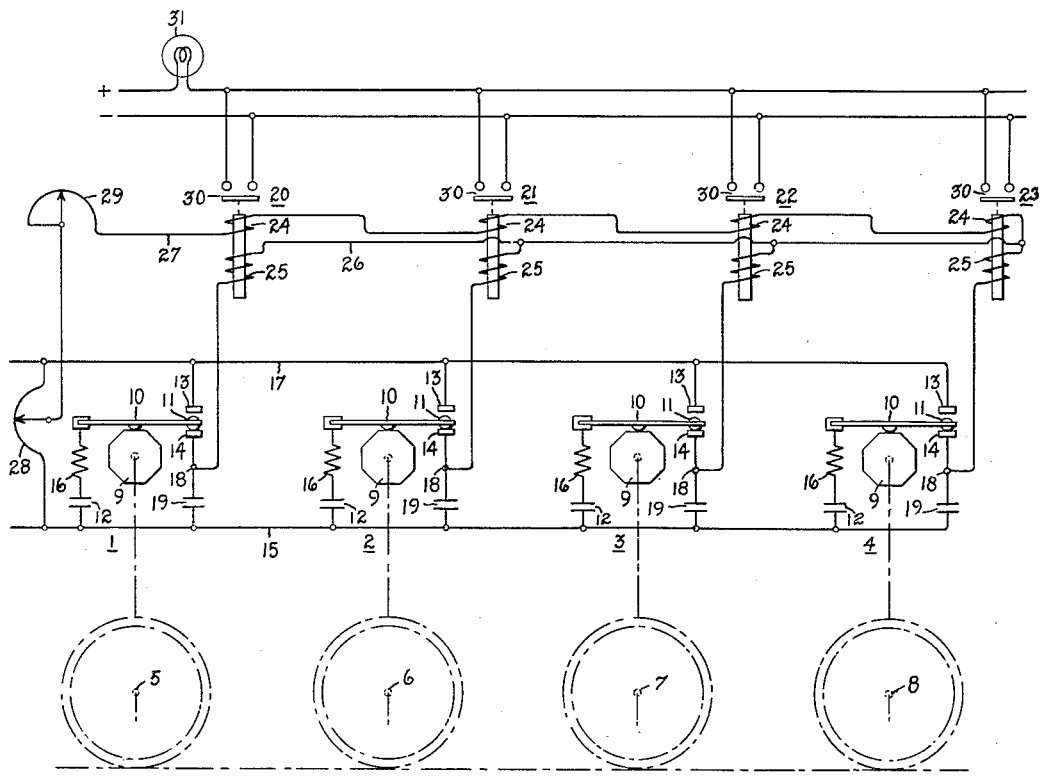
Inventor:
William D. Ryckman, Jr.
by Ernest C. Britton
His Attorney.

Patented Apr. 8, 1952

2,592,342

UNITED STATES PATENT OFFICE 2,592,342

WHEEL SLIP PROTECTIVE DEVICE

William D. Ryckman, Jr., Schenectady, N. Y., assignor to General Electric Company, a corporation of New York Application July 18, 1951, Serial No. 237,374

17 Claims. (Cl. 177—311)

1

This invention relates to systems for detecting the wheel slip of rail vehicles, for example, diesel-electric locomotives.

In the operation of self-propelled rail vehicles, such as diesel-electric locomotives having a plurality of electric traction motors separately connected to the driving axles, one pair of wheels connected to an axle sometimes slips on the track. This wheel slippage may be caused when rapid acceleration is attempted under heavy load conditions, and may also occur when the locomotive is running at high speed due to track condition, track irregularities, vibration, etc. When this slippage occurs, the motor driving the slipping axle accelerates to a higher speed than the other motors and may be damaged due to the high resultant mechanical stresses. Furthermore, when the traction motors are connected for energization in either series or parallel circuit relation, the slipping axle relieves its connected motor of any substantial portion of the load so that the remaining motors connected to the non-slipping axles are subject to higher currents and are in turn liable to cause additional wheels to slip. In addition, wheel slip may occur during braking as a result of locked brakes causing substantial damage to the locked wheels.

It is therefore desirable in the design of such vehicles to provide for the detection of wheel slippage, the detecting device being connected to either reduce the energization of the motor connected to the slipping axle or to merely give an indication to the engineman of the wheel slippage so that he can manually reduce the excitation to the traction motors.

Numerous methods of wheel slip detection have been provided in the past including the field drop comparison system, as shown in Patent 2,328,994 to Harold S. Ogden, issued September 7, 1943, and assigned to the assignee of the present application. Other systems have utilized centrifugal switches on the axles, pneumatic devices using a friction drive inertia flywheel, and commutator and brush arrangements which compare the speed of two axles on the same truck. It is desirable, however, to provide a system in which the speed of each axle is compared with the average of the other axle speeds, and which is characterized by its relative simplicity which permits servicing by regular maintenance personnel.

It is therefore an object of this invention to provide an improved wheel slip detection system possessing the features enumerated above.

Further objects and advantages of this invention will become apparent and the invention will

2 be better understood by reference to the following description and the accompanying drawing, and the features of novelty which characterize this invention will be pointed out with particularity in the claims annexed to and forming a part of this specification.

In accordance with this invention, each axle is provided with a tachometer unit which produces a signal responsive to the speed thereof. This unit may be a tachometer generator, or an arrangement having a condenser which is alternately charged from a source of direct current and discharged across an output circuit responsive to axle revolution. The output from the tachometer units is fed into a circuit which balances the current in each unit against the total of all the currents and means are provided responsive to a current unbalance caused by wheel slip to provide an indication of the condition.

The single figure of the drawing is a schematic illustration of the improved wheel slip detection system of this invention.

Referring now to the drawing, there is shown a wheel slip detection system in accordance with this invention applied to a locomotive having two 2-axle trucks with tachometer units 1, 2, 3 and 4 being respectively driven by axles 5, 6, 7 and 8. These tachometer units are preferably mounted directly on the axle, but may be driven by the axle in any suitable manner. Each of the tachometer units includes a cam 9 directly driven by its associated axle, a movable contact element 10 actuated by the cam 9, and having movable contacts 11, and a capacitor 12. The movable contact element 10 is arranged to alternately contact the stationary contacts 13 and 14 responsive to rotation of the cam 9. The capacitor 12 is connected to one side 15 of an external source of direct current, and is arranged in series with resistor 16 and the movable contact element 10. The stationary contact 13 is connected to the other side 17 of the source of direct current, and the stationary contact 14 is connected to an output terminal 18 which, with the line 15, forms the output circuit of the tachometer unit. A filter condenser 19 is connected between the terminal 18 and the line 15 to provide a steady direct current output. It will now be readily apparent that when the cam 9 rotates, the movable contact element 10 alternately connects the capacitor 12 across the lines 15 and 17 of the source of direct current, and across the output circuit. Thus, when the movable contact 11 of the movable contact element 10 contacts the external contact 13, the capacitor 12 is charged across the external source of direct current and when the movable contact 11 contacts the stationary contact 14, the capacitor is discharged across the output circuit. The time constants of this circuit are chosen so that the capacitor 12 has time to charge to practically the full supply voltage, even when the cam 9 is turning at top speed. For example, in a system actually constructed with a 75-volt source of direct current across lines 15 and 17, a satisfactory value for the capacitor 12 was found to be 8 mfd., 1000 mfd. for the capacitor 19, 20 ohms for the resistance 16, and a load resistance of 300 ohms, as will be hereinafter more fully described. It will be readily apparent that the charging of the capacitor 12 to the same voltage and discharging across the output circuit responsive to rotation of the axle will result in the average current in the output circuit varying directly in proportion to the axle speed.

In order to compare the speeds of the axles 5, 6, 7 and 8, and to detect a difference in speed of any one of the axles, relays 20, 21, 22 and 23 are provided respectively associated with the tachometer units 1, 2, 3 and 4. Each of these relays is provided with a pair of coils 24 and 25. The relay coils 25 are respectively connected across the terminals 18, and a bus 26, which is in turn connected to line 15 of the source of direct current by means of a line 27 having the relay coils 24 arranged in series therewith. Potentiometers 28 and 29 are provided to adjust the sensitivity of the system. The parallel connected relay coils 25 and serially connected relay coils 24 thus form the load circuit for the tachometer units 1, 2, 3 and 4.

It will now be readily seen that the outputs of the tachometer units 1, 2, 3 and 4 are respectively connected in parallel with the relay coils 25 respectively arranged in series with the tachometer units and with the relay coils 24 serially connected across the ends of the coils 25 remote from the terminals 18 and the side 15 of the source of direct current. Thus, when the capacitors 12 are discharged, the discharge circuits are respectively through the relay coils 25 and the serially connected relay coils 24 through the potentiometers 29 and 28 back to the capacitors. It will thus be seen that only the current from each tachometer unit traverses the relay coils 25, while the total current, which is the sum of the currents from all of the tachometer units, traverses the relay coils 24. In this way, the currents in each tachometer unit are balanced against the total current, and to provide for current balance in each of the relays 20, 21, 22 and 23, the coils 25 have the same ratio of turns to the coils 24 as the number of axles. For example, in the locomotive shown in the drawing having four axles, relay coils 25 have four times the turns provided on relay coils 24. Thus, the ampere-turns in the relays are balanced when all of the tachometer units are operating at the same speed and thus producing the same current. It will be readily seen that each relay will be balanced when its coil 25 is carrying one-quarter of the current traversing its coil 24, and thus the relay will not pick up closing the contacts 30 to illuminate the indicating light 31. However, if slippage occurs so that one of the axles speeds up, or locks, as in braking, its associated tachometer unit will not provide one-quarter of the total current thus producing an unbalance in its associated relay, causing its associated relay to pick up, closing the contacts 30 and illuminating the indicating light 31. It will be seen that the potentiometer 28 is connected across the lines 15 and 17 of the source of direct current, thus permitting a variable voltage bias to be placed on the circuit to control the overall sensitivity and that since all of the tachometer unit current traverses the line 27 and the potentiometer 29, the adjustment of the potentiometer 29 provides a further voltage bias to determine the sensitivity taper with speed.

In order for the circuit to differentiate between a fast and a slow axle, the relays 20, 21, 22 and 23 must be of the polarized type, i. e., having a neutral position so that when the mmf. of coil 24 exceeds the mmf. of coil 25, one circuit will be closed, and when the mmf. of coil 25 exceeds that of coil 24, another will be closed.

It will be readily understood that a separate indicator lamp may be associated with each of the relays 20, 21, 22 and 23 so that the engineman may be advised of the particular axle that is slipping, or that the relays 20, 21, 22 and 23 may be connected in a circuit to reduce excitation on the motor connected to the slipping axle. It will also be readily understood that axle mounted tachometer generators may be substituted for the capacitor tachometer units 1, 2, 3 and 4.

It will now be seen that this wheel slip detection system provides a circuit in which the current from each axle-driven tachometer unit, which is directly proportional to the speed thereof, is balanced against the total current from all of the units, which by virtue of the turn ratio between the relay coils 25 and relay coils 24 is equivalent to balancing the current of each tachometer unit against the average of all the currents, or the average axle speed, and thus, any departure of the speed of any axle from the average, either fast as in slipping or slow as in locking, provides an unbalance which is utilized to provide an indication of the wheel slip condition. It will also be seen that this system is characterized by its simplicity and ease of maintenance.

While I have illustrated and described a particular embodiment of this invention, further modifications and improvements will occur to those skilled in the art. I desire that it be understood, therefore, that this invention is not limited to the forms shown, and I intend in the appended claims to cover all modifications which do not depart from the spirit and scope of this invention.

What I claim as new and desire to secure by Letters Patent of the United States is:

1. A wheel slip detection circuit for a rail vehicle having a plurality of axles comprising means for producing a signal proportional to the speed of each of said axles, a load circuit for said signal producing means including means for respectively balancing the current in each of said signal producing means against the total current in said load circuit whereby a difference in speed of any one of said axles with respect to the other of said axles produces a current unbalance in said current balancing means associated therewith, and means respectively responsive to a current unbalance in said current balancing means for indicating wheel slip.

2. A wheel slip detection circuit for a rail vehicle having a plurality of axles comprising a plurality of means respectively operatively connected to said axles for producing signals proportional to the speed thereof, said signal producing means being connected in parallel across a load circuit, means for respectively balancing the current in the circuits of said signal producing means against the total current in said load circuit whereby a difference in speed of any one of said axles with respect to the other of said axles produces a current unbalance in the current balancing means associated therewith, and means respectively responsive to a current unbalance in said current balancing means for indicating wheel slip.

3. A wheel slip detection circuit for a rail vehicle having a plurality of axles comprising a plurality of means respectively operatively connected to said axles for producing signals proportional to the speed thereof, said signal producing means being connected in parallel circuit relation, a plurality of current balancing means respectively having first current responsive elements arranged in series with the circuits of said signal producing means and second current responsive elements connected in series circuit relation across the circuits of said signal producing means, said first and second current responsive elements respectively balancing the currents in the circuits of said signal producing means against the total current in said series circuit whereby a difference in the speed of any one of said axles with respect to the other of said axles produces a current unbalance in said current balancing means associated therewith, and means respectively responsive to a current unbalance in said current balancing means for indicating wheel slip.

4. A wheel slip detection circuit for a rail vehicle having a plurality of axles comprising a plurality of means respectively operatively connected to said axles for producing signals proportional to the speed thereof, the output circuits of said signal producing means being connected in parallel, another circuit connected across the output circuits of said signal producing means, a plurality of current balancing means having first current responsive means respectively arranged in said signal producing means output circuits and second current responsive means respectively arranged in said other circuit, said first and second current responsive means respectively balancing the currents in said signal producing means output circuits against the total current in said other circuit whereby a difference in the speed of any one of said axles with respect to the other of said axles produces a current unbalance in the current balancing means associated therewith, and means respectively responsive to a current unbalance in said current balancing means for indicating wheel slip.

5. A wheel slip detection circuit for a rail vehicle having a plurality of axles comprising a plurality of means respectively operatively connected to said axles for producing signals proportional to the speed thereof, the output circuits of said signal producing means being connected in parallel, another circuit connected across said signal producing means output circuits, a plurality of current balancing means having first current responsive means respectively serially connected in said signal producing means output circuits and second current responsive means respectively serially connected in said other circuit, said first and second current responsive means respectively balancing the currents in said signal producing means output circuits against the total current in said other circuit whereby a difference in the speed of any one of said axles with respect to the other of said axles produces a current unbalance in the current balancing means associated therewith, and means respectively responsive to a current unbalance in said current balancing means for indicating wheel slip.

6. A wheel slip detection circuit for a rail vehicle having a plurality of axles comprising a plurality of means respectively operatively connected to said axles for producing signals proportional to the speed thereof, the output circuits of said signal producing means being connected in parallel, and a plurality of current balancing relays having first operating coils respectively connected in series in said signal producing means output circuits and second operating coils respectively connected in series circuit relation across said signal producing means output circuits, said first and second relay operating coils being arranged to respectively balance the currents in said signal producing means output circuits against the total current in said second relay coils whereby a difference in speed of any one of said axles with respect to the other of said axles produces a current unbalance in the relay associated therewith, said relays being respectively operable responsive to current unbalance and being connected in a wheel-slip indicating circuit.

7. A wheel slip detection circuit for a rail vehicle having a plurality of axles comprising a plurality of means respectively operatively connected to said axles for producing signals proportional to the speed thereof, the output circuits of said signal producing means being connected in parallel and a plurality of current balancing relays having first operating coils respectively connected in series in said signal producing means output circuits and second operating coils respectively connected in series circuit relation across said signal producing means output circuit, said first operating coils having a ratio of turns to said second operating coils the same as the number of said axles so that said first and second operating coils respectively balance the currents in said signal producing means output circuits against the total current in said second operating coils whereby a difference in speed of any one of said axles with respect to the other of said axles produces a current unbalance in the relay associated therewith, said relays being respectively operable responsive to current unbalance and being connected in a wheel-slip indicating circuit.

8. A wheel slip detection circuit for a rail vehicle having a plurality of axles comprising a source of direct current, a plurality of tachometer units respectively driven by said axles, each of said tachometer units having a condenser and means operably connected to its associated axle for alternately charging said condenser across said source of direct current and discharging said condenser across an output circuit whereby the average current therein is proportional to the speed of said associated axle, said tachometer unit output circuits being respectively connected in parallel across a load circuit, means for respectively balancing the current in said output circuits against the total current in said load circuit whereby a difference in speed of any one of said axles with respect to the other of said axles produces a current unbalance in the current balancing means associated therewith, and means respectively responsive to a current unbalance in said current balancing means for indicating wheel slip.

9. A wheel slip detection circuit for a rail vehicle having a plurality of axles comprising a source of direct current, a plurality of tachometer units respectively driven by said axles, each of said tachometer units having a condenser and means operably connected to its associated axle for alternately charging said condenser across said source of direct current and discharging said condenser across an output circuit whereby the average current therein is proportional to the speed of said associated axle, said tachometer output circuits being connected in parallel circuit relation, a plurality of current balancing means respectively having first current responsive elements arranged in series with said tachometer output circuits and second current responsive elements connected in series circuit relation across said tachometer output circuits, said first and second current responsive elements respectively balancing the currents in said tachometer output circuits against the total current in said series circuit whereby a difference in the speed of any one of said axles with respect to the other of said axles produces a current unbalance in the current balancing means associated therewith, and means respectively responsive to a current unbalance in said current balancing means for indicating wheel slip.

10. A wheel slip detection circuit for a rail vehicle having a plurality of axles comprising a source of direct current, a plurality of tachometer units respectively driven by said axles, each of said tachometer units having a condenser and means operably connected to its associated axle for alternately charging said condenser across said source of direct current and discharging said condenser across an output circuit whereby the average current therein is proportional to the speed of said associated axle, said tachometer output circuits being connected in parallel, and a plurality of current balancing relays having first operating coils respectively connected in series in said tachometer unit output circuits and second operating coils respectively connected in series circuit relation across said tachometer output circuits, said first and second relay operating coils being arranged to respectively balance the currents in said tachometer output circuits against the total current in said second relay coils whereby a difference in speed of any one of said axles with respect to the other of said axles produces a current unbalance in the relay associated therewith, said relays being respectively operable responsive to current unbalance and being connected in a wheel-slip indicating circuit.

11. A wheel slip detection circuit for a rail vehicle having a plurality of axles comprising a source of direct current, a plurality of tachometer units respectively driven by said axles, each of said tachometer units having a condenser and means operably connected to its associated axle for alternately charging said condenser across said source of direct current and discharging said condenser across an output circuit whereby the average current therein is proportional to the speed of said associated axle, said tachometer output circuits being connected in parallel, and a plurality of current balancing relays having first operating coils respectively connected in series in said tachometer unit output circuits and second operating coils respectively connected in series circuit relation across said tachometer unit output circuits, said first operating coils having a ratio of turns to said second operating coils the same as the number of said axles so that said first and second operating coils respectively balance the currents in said tachometer unit output circuits against the total current in said second operating coils whereby a difference in speed of any one of said axles with respect to the other of said axles produces a current unbalance in the relay associated therewith, said relays being respectively operable responsive to current unbalance and being connected in a wheel-slip indicating circuit.

12. A wheel slip detection circuit for a rail vehicle having a plurality of axles comprising a source of direct current, a plurality of tachometer units respectively driven by said axles, each of said tachometer units having a condenser, switch means having a first position with said condenser connected to be charged across said source of direct current and a second position with said condenser connected to be discharged across an output circuit, and means operatively connected to its associated axle for alternately moving said switch to said first and second positions whereby the average current in said output circuit is proportional to the speed of said associated axle, said tachometer output circuits being connected in parallel across a load circuit, means for respectively balancing the current in said output circuits against the total current in said load circuit whereby a difference in speed of any one of said axles with respect to the other of said axles produces a current unbalance in the current balancing means associated therewith, and means respectively responsive to a current unbalance in said current balancing means for indicating wheel slip.

13. A wheel slip detection circuit for a rail vehicle having a plurality of axles comprising a source of direct current, a plurality of tachometer units respectively driven by said axles, each of said tachometer units having a condenser, switch means having a first position with said condenser connected to be charged across said source of direct current and a second position with said condenser connected to be discharged across an output circuit, and means operatively connected to its associated axle for alternately moving said switch to said first and second positions whereby the average current in said output circuit is proportional to the speed of said associated axle, said tachometer output circuits being connected in parallel, a plurality of current balancing means respectively having first current responsive elements arranged in series with said tachometer unit output circuits and second current responsive elements connected in series circuit relation across said output circuits, said first and second current responsive elements respectively balancing the currents in said output circuits against the total current in said series circuit whereby a difference in speed of any one of said axles with respect to the other of said axles produces a current unbalance in the current balancing means associated therewith, and means respectively responsive to a current unbalance in said current balancing means for indicating wheel slip.

14. A wheel slip detection circuit for a rail vehicle having a plurality of axles comprising a source of direct current, a plurality of tachometer units respectively driven by said axles, each of said tachometer units having a condenser, switch means having a first position with said condenser connected to be charged across said source of direct current and a second position with said condenser connected to be discharged across an output circuit, and means operatively connected to its associated axle for alternately moving said switch to said first and second positions whereby the average current in said output circuit is proportional to the speed of said associated axle; said tachometer output circuits being connected in parallel, and a plurality of current balancing relays having first operating coils respectively connected in series in said output circuits and second operating coils respectively connected in series circuit relation across said output circuits, said first and second relay operating coils being arranged to respectively balance the currents in said output circuits against the total current in said second relay coils whereby a difference in speed of any one of said axles with respect to the other of said axles produces a current unbalance in the relay associated therewith, said relays being respectively operable responsive to current unbalance and being connected in a wheel-slip indicating circuit.

15. A wheel slip detection circuit for a rail vehicle having a plurality of axles comprising a source of direct current, a plurality of tachometer units respectively driven by said axles, each of said tachometer units having a condenser, switch means having a first position with said condenser connected to be charged across said source of direct current and a second position with said condenser connected to be discharged across an output circuit, and means operatively connected to its associated axle for alternately moving said switch to said first and second positions whereby the average current in said output circuit is proportional to the speed of said associated axle; said tachometer output circuits being connected in parallel, and a plurality of current balancing relays having first operating coils respectively connected in series in said output circuits and second operating coils connected in series circuit relation across said output circuits, said first operating coils having a ratio of turns to said second operating coils the same as the number of said axles so that said first and second operating coils respectively balance the currents in said output circuits against the total current in said second operating coils whereby a difference in speed of any one of said axles with respect to the other of said axles produces a current unbalance in the relay associated therewith, said relays being respectively operable responsive to current unbalance and being connected in a wheel-slip indicating circuit.

16. A wheel slip detection circuit for a rail vehicle having a plurality of axles comprising a source of direct current, a plurality of tachometer units respectively driven by said axles, each of said tachometer units having a condenser and means operably connected to its associated axle for alternately charging said condenser across said source of direct current and discharging said condenser across an output circuit whereby the average current therein is proportional to the speed of said associated axle, said tachometer output circuits being connected in parallel, a plurality of current balancing relays having first operating coils respectively connected in series in said output circuits, and a potentiometer connected across said source of direct current, said relays having second operating coils respectively connected in series circuit relation across said output circuits and said potentiometer, said first and second relay operating coils being arranged to respectively balance the currents in said output circuits against the total current in said second relay coils whereby a difference in speed of any one of said axles with respect to the other of said axles produces a current unbalance in the relay associated therewith, said relays being respectively operable responsive to current unbalance and being connected in a wheel-slip indicating circuit.

17. A wheel slip detection circuit for a rail vehicle having a plurality of axles comprising a source of direct current, a plurality of tachometer units respectively driven by said axles, each of said tachometer units having a condenser, switch means having a first position with said condenser connected to be charged across said source of direct current and a second position with said condenser connected to be discharged across an output circuit, and means operatively connected to its associated axle for alternately moving said switch to said first and second positions whereby the average current in said output circuit is proportional to the speed of said associated axle; said tachometer output circuits being connected in parallel, a plurality of current balancing relays having first operating coils respectively connected in series in said output circuits, and a potentiometer across said source of direct current, said relays respectively having second operating coils respectively connected in series circuit relation across said output circuits and said potentiometer, said first and second relay operating coils being arranged to respectively balance the currents in said output circuits against the total current in said second operating coils whereby a difference in speed of any one of said axles with respect to the other of said axles produces a current unbalance in the relay associated therewith, said relays being respectively operable responsive to current unbalance and being connected in a wheel-slip indicating circuit.

WILLIAM D. RYCKMAN, Jr.

REFERENCES CITED

The following references are of record in the file of this patent:

UNITED STATES PATENTS

| Number | Name | Date |
|---|---|---|
| 1,952,369 | Gardner | Mar. 27, 1934 |
| 1,982,290 | Gardner | Nov. 27, 1934 |
| 2,436,341 | Weybrew | Feb. 17, 1948 |